Figure 1:
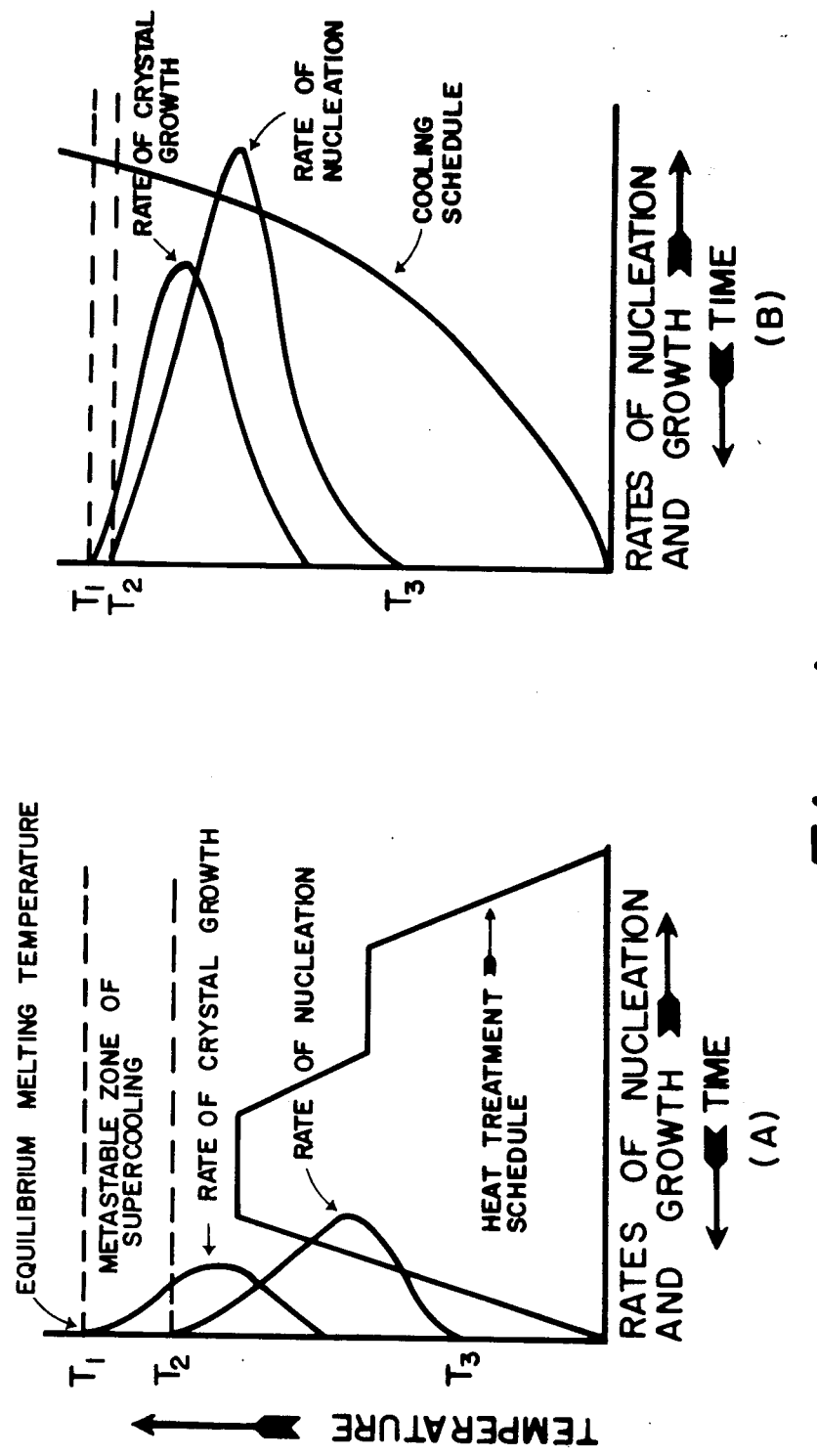

United States Patent [19]

Grossman

[11] 4,239,520
[45] Dec. 16, 1980

[54] SPONTANEOUSLY FORMED MACHINABLE GLASS-CERAMICS

[75] Inventor: David G. Grossman, Corning, N.Y.
[73] Assignee: Corning Glass Works, Corning, N.Y.
[21] Appl. No.: 559,787
[22] Filed: Mar. 19, 1975
[51] Int. Cl.³ .................. C03B 27/00; C03B 32/00; C03C 3/22
[52] U.S. Cl. .................................. 65/33; 65/114
[58] Field of Search .................................. 65/33, 114

[56] References Cited

U.S. PATENT DOCUMENTS

| | | | |
|---|---|---|---|
| 3,690,855 | 9/1972 | Schultz | 65/33 |
| 3,732,087 | 5/1973 | Grossman | 65/33 |
| 3,741,861 | 6/1973 | Andrieu | 65/33 X |
| 3,801,295 | 4/1974 | Beal et al. | 65/33 |
| 3,804,608 | 4/1974 | Gaskell et al. | 65/33 |
| 3,846,101 | 11/1974 | Gaskell et al. | 65/33 |
| 3,985,531 | 12/1976 | Grossman | 65/33 |

Primary Examiner—Richard V. Fisher
Attorney, Agent, or Firm—Clinton S. Janes, Jr.; Clarence R. Patty, Jr.

[57] ABSTRACT

The instant invention is concerned with the manufacture of articles exhibiting the physical properties and internal microstructure of glass-ceramic bodies but which can be formed spontaneously from a molten glass. Hence, heat treatment of a precursor glass body is not required to cause the crystallization in situ thereof, such as is demanded in the production of conventional glass-ceramic articles. More specifically, this invention relates to the manufacture of glass-ceramic articles which are capable of being mechanically machined, having compositions within the $K_2O$—$Li_2O$—$MgO$—$SiO_2$—F field, wherein a fluormica comprises the principal crystal phase, and which can be formed spontaneously from a molten glass batch.

3 Claims, 2 Drawing Figures

RATES OF NUCLEATION AND GROWTH WITHIN (A) CONVENTIONAL AND (B) SPONTANEOUSLY FORMED GLASS-CERAMIC SYSTEMS (A)

(B)

SPONTANEOUSLY FORMED MACHINABLE GLASS-CERAMICS

U.S. Applications Ser. Nos. 559,726 (now U.S. Pat. No. 3,985,532), 559,789, and 559,727 (now U.S. Pat. No. 3,985,533), filed concurrently herewith by the present applicant, disclose the production of spontaneously-formed glass-ceramic articles wherein celsian, mullite, and beta-spodumene solid solution, respectively, constitutes the predominant crystal phase. U.S. Application Ser. No. 559,725 (now U.S. Pat. No. 3,985,531), filed concurrently herewith by the present applicant and U.S. Application Ser. No. 559,732 (now U.S. Pat. No. 3,985,534) filed concurrently herewith by J. E. Flannery and D. R. Wexell, describe the manufacture of spontaneously formed glass-ceramic articles wherein a fluormica comprises the primary crystal phase. U.S. Applications Ser. Nos. 559,731 (now U.S. Pat. No. 3,989,496) and 559,730 (now U.S. Pat. No. 4,000,998), filed concurrently herewith by H. L. Rittler, discuss the formation of spontaneously-formed glass-ceramic articles wherein BaO and/or SrO—$Fe_2O_3$—$SiO_2$ solid solution and carnegieite and/or nepheline solid solution, respectively, constitutes the principal crystal phase. U.S. Application Ser. No. 559,786, filed concurrently herewith by G. H. Beall, discloses the production of spontaneously-formed glass-ceramic articles wherein alpha-quartz solid solution comprises the predominant crystal phase. Finally, U.S. Application Ser. No. 559,788, filed concurrently herewith by G. H. Beall, P. E. Blaszyk, and W. T. Brydges, III, describes the manufacture of spontaneously formed glass-ceramic articles wherein beta-spodumene solid solution consitutues the primary crystal phase.

U.S. Pat. No. 2,920,971 provides the genesis for the field of glass-ceramics. As is described therein, the formation of a glass-ceramic article is founded upon the controlled heat treatment of a parent or precursor glass body. Hence, three general steps are involved in the classic method for producing glass-ceramic articles. First, a glass-forming batch, commonly including a nucleating agent, is melted. Second, this melt is simultaneously cooled to at least within and, more customarily, below the transformation range to yield an essentially crystal-free glass and an article of a desired geometry shaped therefrom. Third, this glass shape is heated to a temperature above the transformation range thereof to cause the growth of crystals in situ. [The transformation range has been considered to constitute the temperature at which a molten mass is transformed into an amorphous solid and has generally been defined as lying in the vicinity of the annealing point of a glass.]

Conventional practice has divided the third or crystallization step into two parts. Thus, the glass body will initially be heated to a temperature slightly above the transformation range and maintained thereat for a sufficient length of time to secure substantial nucleation. Subsequently, the nucleated body will be heated to a still higher temperature, frequently above the softening point of the original glass, and held at that temperature for a period of time sufficient to establish the growth of crystals on the nuclei.

This carefully controlled heat treatment of the glass body results in a homogeneously crystallized article wherein the crystals are relatively uniform in size. Customarily, glass-ceramic articles are predominantly crystalline and the crystals, themselves, very fine-grained. However, for a more detailed discussion of the theoretical aspects and practical considerations involved in the structure and production of glass-ceramic articles, reference is made to U.S. Pat. No. 2,920,971, supra.

During the cooling of molten batches to form glass bodies, it has frequently been observed that crystallization will occur, these crystals beginning at the surface or at the interface between the molten batch and a forming element and growing inwardly into the glass body. This phenomenon has been designated as "normal" devitrification and is customarily looked upon as undesirable since the final microstructure consists of randomly-sized, relatively coarse-grained crystals which are commonly oriented in a plane perpendicular to the surface. That kind of microstructure usually results in a mechanically-weak body.

The mechanism of that "normal" devitrification process is basically different from that occurring in the manufacture of glass-ceramic articles because it is concerned with crystallization taking place at or near the liquidus temperature of the molten batch. Another instance of crystallization occurring at or near the liquidus temperature is found in the fusion casing of refractory ceramic materials. In contrast to those processes, the production of glass-ceramic articles, utilizing the controlled heat treatment of precursor glass bodies, involves temperatures considerably below the liquidus, thereby insuring a larger degree of supercooling, such that the development of crystals takes place at a much higher viscosity level of the glass where time can play a part in crystal growth.

The present invention is concerned with the production of spontaneously formed glass-ceramic articles. Thus, certain compositions within the $K_2O$—$Li_2O$—$MgO$—$SiO_2$—F system, when merely cooled from a molten batch, can yield bodies consisting essentially of relatively uniformly-sized crystals homogeneously dispersed within a glassy matrix. In sum, without any further heat treatment, those bodies will be highly crystalline, i.e., greater than 50% and, frequently, greater than 75% by volume crystalline, and the crystals, themselves, consist predominantly of interlocking fluormica laths and platelets having diameters commonly greater than one micron with aspect ratios greater than three.

FIG. 1 provides a graphic explanation of the differences in crystallization mechanism obtaining between the spontaneously formed glass-ceramic articles of the instant invention and classic glass-ceramic articles. The critical aspect is believed to be the overlap existing in the rate curves for nucleation and crystallization shown therein. Thus, as can be observed, below the equilibrium melting temperature of the viscous liquid $T_1$, there is a temperature range ($T_1$-$T_2$) wherein nuclei do not develop at a perceptible rate. This range of temperatures is termed the metastable zone of supercooling. In the production of conventional glass-ceramic articles, no crystals form at or just below the metastable zone because the nucleation rate thereat is so slow that no growth sites are provided for crystals. Therefore, nucleation takes place within the $T_2$-$T_3$ temperature interval.

The crystallization mechanism involved in the production of classic glass-ceramic bodies is depicted in FIG. 1(A). As is pictured there, crystallization is promoted by initially reheating the supercooled liquid, i.e., the precursor glass body, into the zone of maximum nucleation, maintaining that temperature for a sufficient period of time to acheive substantial development of nuclei, and then further heating the nucleated body into the range of maximum crystal growth and holding at that temperature for a sufficient length of time to attain the desired growth of crystals.

The contrasting nucleation-crystallization relationship comprising the basis of spontaneously-formed glass-ceramic articles is represented graphically in FIG. 1(B). As can readily be seen, the metastable zone of supercooling is very narrow and the rates of nucleation and crystal growth considerably more rapid. These circumstances result in a situation where nucleation and crystallization can take place at such a rapid rate immediately below the region of metastable supercooling that dwell periods of any substantial length within these respective temperature zones are not required. Hence, the simple cooling of the melt can yield a body having relatively uniformly-sized crystals homogeneously dispersed therein. It will be immediately evident, of course, that severe quenching of the molten batch might cool the melt at such a rapid rate through the nucleation and crystallization zones that the desired glass-ceramic microstructure would not be produced.

U.S. Pat. No. 3,804,608 discloses a number of glass-ceramic bodies which can be formed without employing the reheating step required in the production of conventional glass-ceramic bodies, but no reference is made therein to compositions within the $K_2O-Li_2O-MgO-SiO_2-F$ field of the instant invention or to products wherein the predominant crystal phase is a fluormica. Moreover, whereas fluorine is mentioned as an optional ingredient in the text of the patent and is reported as having been used in two of the working examples, there is no statement as to any particular utility therefor. Yet, its presence in the instant invention is demanded to obtain the desired fluormica crystals. Also, there is no disclosure in that patent of a material exhibiting machinability properties.

The characteristic of machinability is generally defined as possessing the potential for being turned, shaped, planed, drilled, milled or otherwise worked or fashioned by hand or machine-operated tools. Glass is commonly recognized as a hard, brittle material having very poor machinability properties. As a result, after a glass article had been produced through hot forming, little can be done to alter the basic shape thereof. Hence, one serious shortcoming in the use of glass as a structural material has been its essential inability to be "field worked", i.e., to be shaped and fitted on a job site.

Therefore, the primary objective of the present invention is to spontaneously form glass-ceramic articles which will exhibit machinability properties and wherein a fluormica is the predominant crystal phase.

That objective can be achieved utilizing compositions consisting essentially, expressed in weight percent on the oxide basis as calculated from the batch, of about 6–11% $K_2O$, 1.7–4% $Li_2O$, 17–25% MgO, 50–65% $SiO_2$, and 5–8.5% F. Although not a required component, the inclusion of up to about 8% $B_2O_3$ is useful in securing a more uniform grain size in the crystals as the molten batch is cooled.

Minor additions of various compatible metal oxides can be tolerated but are not favored. Hence, the preferred products will be composed solely of the above-recited components with, optionally, $B_2O_3$, and the total of all other additions will most preferably be held below about 5% by weight. Such extraneous additions may include $Na_2O$, CaO, SrO, ZnO, BaO, PbO, $Al_2O_3$, $ZrO_2$, and $TiO_2$. Nevertheless, none of these appear to improve either the machinability character or the microstructure of the crystalline body. $P_2O_5$ is generally avoided since it appears to simply form part of the residual glassy matrix. Where desired, $As_2O_5$ can be included in its conventional role as a fining agent.

In general, the preferred composition ranges of components to achieve the bodies containing fluormica having the highest aspect ratios and exhibiting the most desirable machinability character consist essentially, by weight, of about 6–9% $K_2O$, 2–4% $Li_2O$, 19–22% MgO, 57–62% $SiO_2$, and 6–8.5% F.

Table I lists a group of glass compositions, expressed in weight percent on the oxide basis as calculated from the batch, operable in the instant invention. Since it is not known with which cation(s) the fluorine is combined, it is merely reported as fluoride (F) and the oxygen $\approx$ fluorine correction factor recorded in accordance with conventional glass analysis practice. The actual batch ingredients can comprise any materials, either the oxide or other compounds, which, upon being melted together, will be converted into the desired oxide in the proper proportion. In the compositions tabulated, $MgF_2$ supplied the fluoride content. Fluorine retention during melting was determined to be about 75%, based upon chemical analyses of the final product.

The batch ingredients were ballmilled together to assist in securing a homogeneous melt and placed into a platinum crucible. After covering, the crucible was positioned in an electrically fired furnace operating at 1450° C. and maintained within the furnace for about four hours. The melt was quite fluid, demonstrating a viscosity of only about 10 poises at that temperature. Subsequently, the melt was poured into a graphite or steel mold to form a slab about 6"×6"×¼" and allowed to cool in the ambient atmosphere to about 775°–825° C., as measured with an optical pyrometer, this cooling being completed in less than about 60 seconds. Thereafter, the slab was transferred to an annealer operating at about 650° C.

The temperature of the melt was monitored with an optical pyrometer during the time it was poured into the mold and the transfer of the slab into the annealer. It appeared that the molten batch stiffened in the manner of a normal glass melt until a temperature of about 950°–1000° C. was approached. At or about that temperature range, a hazy opalization took place at the edges of the slab and moved toward the center thereof. A wave of opaque crystallization followed closely behind. As was observed above, the inclusion of $B_2O_3$ is helpful in securing more uniformly sized fluormica crystals. Also, $B_2O_3$ appears to alleviate warping tendencies which can result through the rapid crystallization.

It is believed likely that this opalization is caused by a phase separation taking place, such as is common in fluorine-containing glass systems. It is further believed that this phase separation enhances the nucleation rate in the compositions of the instant invention since, without the prior opalization, the desired uniformly sized, high aspect ratio fluormica crystals will not be developed. FIG. 1(B) can be useful in providing an explanation for this phenomenon. Thus, as is shown therein, a very high degree of nucleation must occur at temperatures near or within the maximum growth temperature to achieve the desired crystallization as the molten batch cools. Hence, this opalization, which occurs at about 100°–300° C. above the annealing point of the glass, furnishes the needed nucleation.

However, whereas spontaneous opalization has been observed in numerous glasses, unless one of the amorphous phases developed in the opalization is at least partially unstable as a glass and crystallites of some type are precipitated to provide nuclei, there will be no spontaneous crystallization of the major glass components following the crystallization. Although the mechanism operating in the extremely rapid and spontaneous growth of crystals is not totally understood, it is postulated that crystallites are formed at temperatures well above the annealing point of the glass during or immediately after the opalization reaction, which then function as nuclei while the glass mass is still within the temperature range of maximum crystal growth.

TABLE I

|  | 1 | 2 | 3 | 4 | 5 | 6 | 7 | 8 | 9 |
|---|---|---|---|---|---|---|---|---|---|
| $SiO_2$ | 64.8 | 64.7 | 59.5 | 58.8 | 58.4 | 57.5 | 58.1 | 61.4 | 58.3 |
| MgO | 20.1 | 18.6 | 20.5 | 21.1 | 20.7 | 21.8 | 22.0 | 19.9 | 21.4 |
| $K_2O$ | 7.8 | 7.2 | 7.8 | 7.7 | 8.3 | 8.2 | 7.4 | 6.4 | 6.7 |
| $Li_2O$ | 3.7 | 2.3 | 2.5 | 2.4 | 2.6 | 2.6 | 2.6 | 2.5 | 3.2 |
| F | 6.3 | 5.8 | 6.9 | 7.4 | 7.4 | 7.3 | 7.3 | 7.1 | 8.1 |
| $B_2O_3$ | — | 3.8 | 5.7 | 5.7 | 5.7 | 5.7 | 5.7 | 5.7 | 5.7 |
|  | 102.7 | 102.4 | 102.9 | 103.1 | 103.1 | 103.1 | 103.1 | 103.0 | 103.4 |
| $O \approx F$ | −2.7 | −2.4 | −2.9 | −3.1 | −3.1 | −3.1 | −3.1 | −3.0 | −3.4 |
|  | 100.0 | 100.0 | 100.0 | 100.0 | 100.0 | 100.0 | 100.0 | 100.0 | 100.0 |

Table II provides a compilation of the physical appearance, the internal microstructure, and physical properties determined after the crystallized slabs had been removed from the annealer. Hence, a visual description of the slab exterior and a fracture surface is reported along with coefficients of thermal expansion ($\times 10^{-7}/°C$.) over the temperature range of room temperature (R.T.) to 500° C. and modulus of rupture values (psi), as determined in accordance with standard measuring techniques. In general, the coefficients of expansion of the crystallized bodies of this invention will range between about $55-85 \times 10^{-7}/°C$. and modulus of rupture values will vary between about 8000-16,000 psi. The machinability character of the bodies was determined qualitatively by their capability of being worked with ordinary steel tools such as a drill and hacksaw.

The micas constitute a family of silicate minerals having a unique two-dimensional or sheet structure. Most naturally-occurring micas are hydroxyl silicates, whereas micas produced synthetically have commonly involved the replacement of the hydroxyl groups within the crystal structure with fluorine. These synthetic micas have been termed fluormicas as a result of that substitution. That is the sense in which fluormica is employed here.

Figure 2:
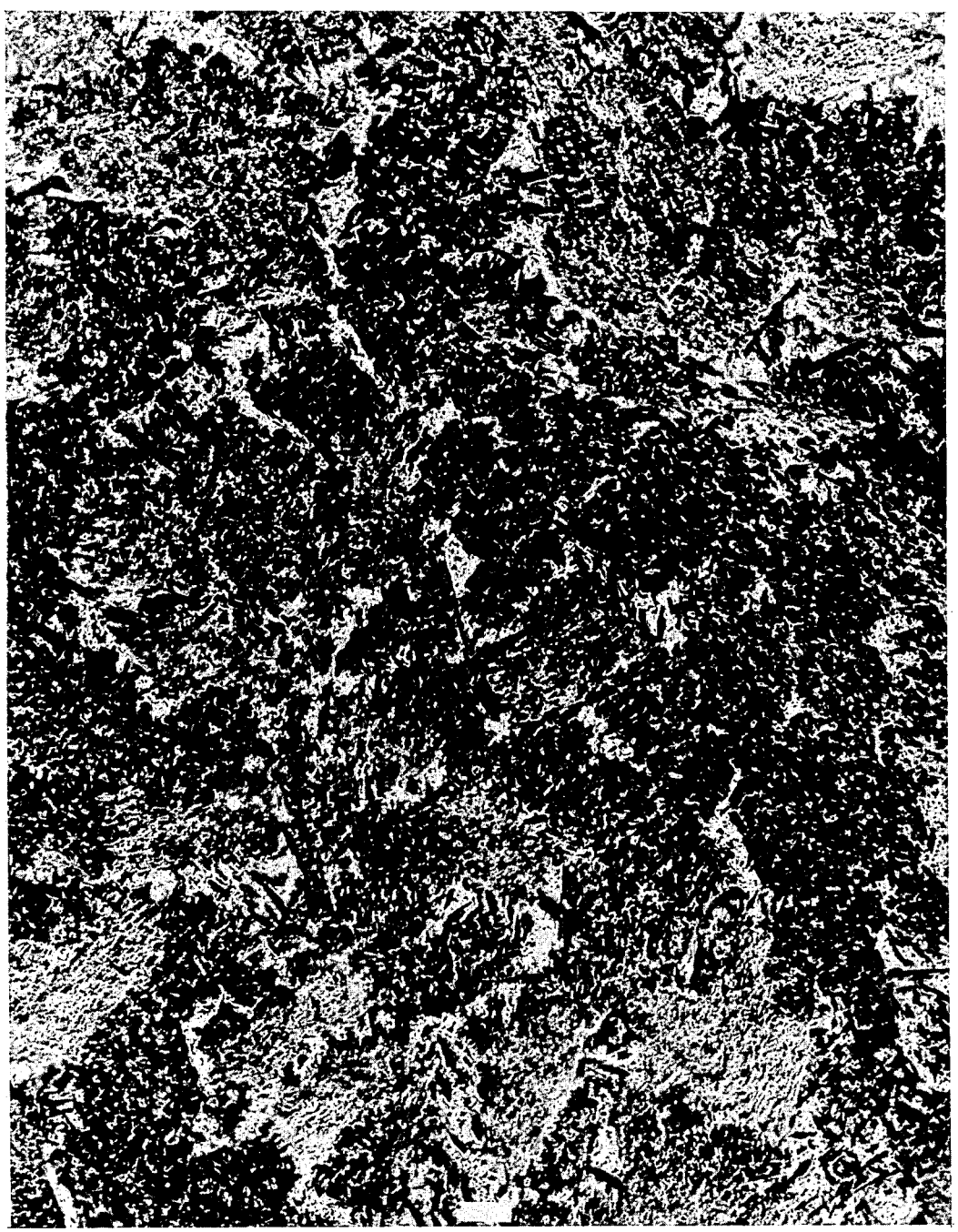

FIG. 2, a replica electron micrograph of the spontaneously-formed slab of Example 3, is illustrative of the characteristic microstructure of the desired highly crystalline products. The white bar at the base of the photograph represents a distance of one micron. The microstructure is seen to consist of large interlocking crystals of high aspect ratios suspended in a minor amount of glassy matrix. X-ray diffraction analysis of the crystal phase has provided a pattern which closely resembles that of a tetrasilicic mica where no trivalent cations such as $Al^{+3}$ ions are substituted in the tetrahedral sheet structure. It is believed that these fluormica crystals have a composition approximating $KMg_{2.5}Si_4O_{10}F_2$.

TABLE II

| Example No. | Visual Description | Machinability | Expansion Coefficient | Modulus of Rupture |
|---|---|---|---|---|
| 1 | Medium to coarse grain, sandy fracture, white opaque | | | |
| 2 | Fine to medium grain, smooth fracture, white opaque | | | 15,900 |
| 3 | Medium to coarse grain, sandy fracture, white opaque | good | 83.3 | |
| 4 | Coarse grain, sandy fracture, white opaque | fair | | |
| 5 | Coarse grain, sandy fracture, white opaque | good | | |
| 6 | Medium grain, fine fracture, white opaque | good | 74.0 | 12,900 |
| 7 | Coarse grain, sandy fracture, white opaque | good | 71.4 | 8,900 |
| 8 | Medium grain, sandy fracture, white opaque | good | 71.1 | 9,200 |
| 9 | Medium to coarse grain, sandy fracture, white opaque | good | 59.6 | 8,100 |

To summarize, the method of the instant invention employs four basic steps. First, a glass-forming batch having a composition within the above-outlined operable ranges is melted. Second, the molten batch is simultaneously cooled to a temperature about 100°-300° C. above the annealing point of the glass to secure phase separation and nucleation and a glass body shaped therefrom. Third, the glass body is exposed to a temperature between the annealing point of the glass and the temperature of phase separation and nucleation for a period of time sufficient to cause crystallization of the desired fluormica phase.

To repeat the statements above, the second or phase separation step is of utmost importance to the operability of the invention. Hence, the rate of cooling the melt must not be so rapid that there is not adequate time for the required phase separation and nucleation to take place. Laboratory experience has demonstrated that, with the compositions of the present invention, cooling rates between about 10°-1000° C./minute will assure satisfactory phase separation and nucleation. These phenomena are normally observed at temperatures between about 800°-1000° C.

Inasmuch as the compositions of this invention crystallize very rapidly after the occurrence of the phase separation and nucleation, exposure times within the crystallization range of as brief as two minutes may be sufficient to achieve high crystallinity, i.e., greater than about 50% by volume of the body. In general, crystallization will take place at temperatures between about 600°-850° C. Nevertheless, as was pointed out above in the specific examples, ease in production has suggested that the glass body which has been phase separated and nucleated be transferred to an annealer operating within or slightly above the crystallization range and cooled to room temperature therein.

Annealing techniques customarily employed in the glassmaking art are equally operable here. Thus, annealing times as brief as 0.5 hour can be utilized, but the more usual practice involves periods of about two hours or more. The use of a very long annealing schedule, however, does not appear to improve the physical properties or internal microstructure of the final product to any significant extent, so this practice is not looked upon with favor from an economic point of view.

Although the preferred mode of the instant invention contemplates crystallizing the article as the phase separated and nucleated glass body is cooled to room temperature, it is quite possible to cool the melt to room temperature at such a rapid rate that phase separation and nucleation will take place, but the subsequent desired fluormica crystallization will not occur, so that the final body is essentially glassy. However, crystallization of that glassy body can be obtained by exposing it to a temperature within the crystallization range in like manner to that described above with respect to the crystallization achieved as the molten batch is merely cooled to room temperature. Thus, here again, it is the appearance of the opalization at temperatures above the crystallization range which is of critical significance to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism effecting this improvement in mechanical strength is not fully understood but is believed to be the result of the small amount of residual glass which is surmised to be present as a continuous phase throughout the crystallized body. This belief is considered to find support in an examination of FIG. 2 wherein the residual glass is seen as small depressed regions due to its greater solubility in the etchant employed to produce the replica electron micrograph.

I claim:

1. A method for making a highly crystalline glass-ceramic article exhibiting good machinability characteristics consisting essentially of fluormica crystals dispersed within a glassy matrix, said crystals constituting at least 50% by volume of said article, which comprises the steps of:
   (a) melting a batch for a glass consisting essentially, by weight on the oxide basis as calculated from the batch, of about 6–11% $K_2O$, 1.7–4% $Li_2O$, 17–25% MgO, 50–65% $SiO_2$, and 5–8.5% F.;
   (b) simultaneously cooling said melt to a temperature about 800°–1000° C. and shaping a glass body therefrom at a rate between about 10°–1000° C./minute to obtain phase separation and nucleation therein;
   (c) further cooling said shaped glass body and exposing said glass body to a temperature between about 600°–850° C. for a sufficient length of time to cause crystallization of the fluormica crystals in said glass body; and then
   (d) cooling the crystallized body to room temperature.

2. A method according to claim 1 wherein said time sufficient to cause crystallization is at least about two minutes.

3. A method according to claim 1 wherein said crystallized body is cooled to room temperature by means of a quick chilling technique to thermally temper said body.

* * * * *